United States Patent Office

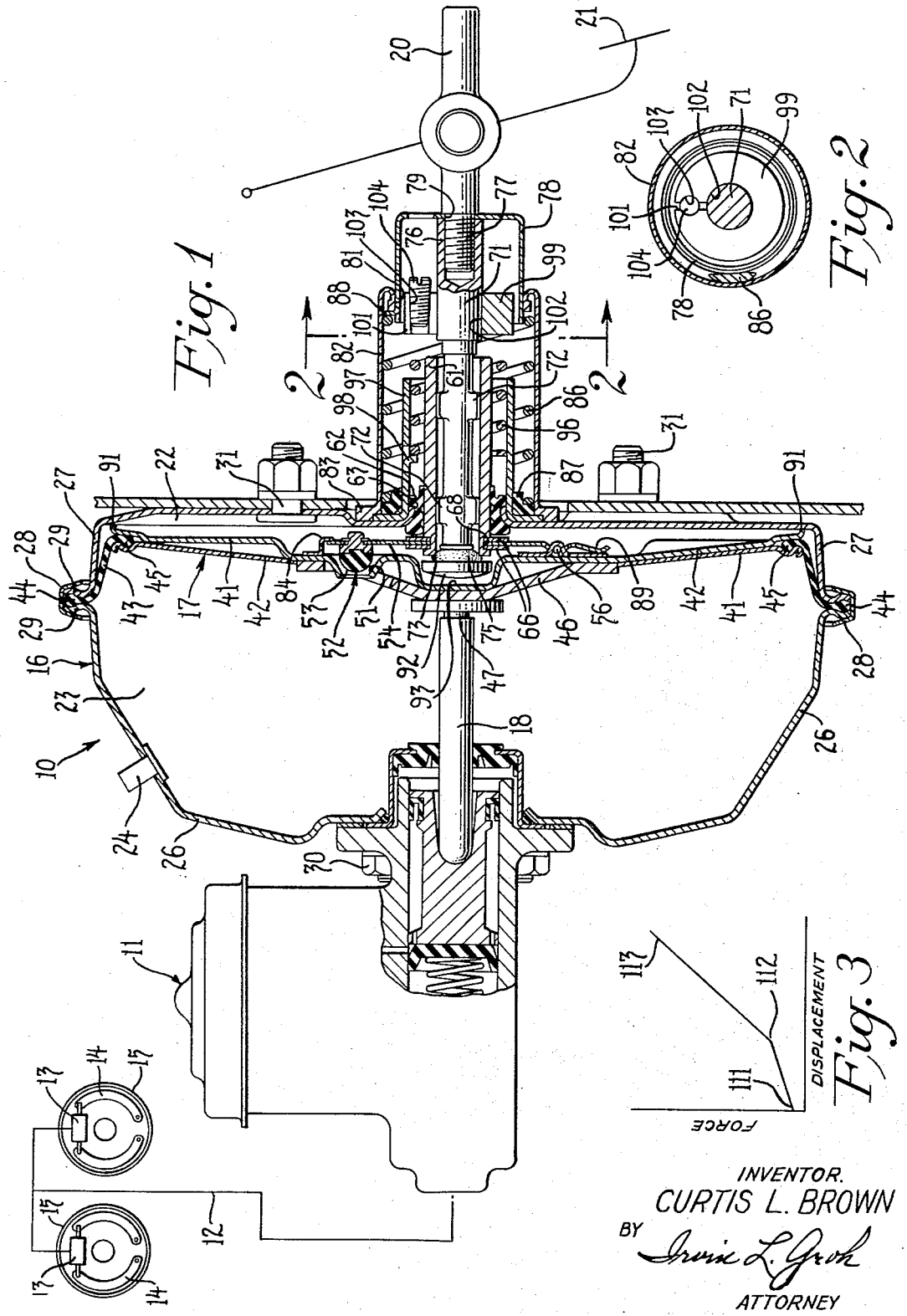

3,358,449
Patented Dec. 19, 1967

3,358,449
POSITION CONTROL POWER BRAKE
Curtis L. Brown, Owosso, Mich., assignor to Midland-Ross Corporation, Cleveland, Ohio, a corporation of Ohio
Continuation of application Ser. No. 391,538, Aug. 24, 1964. This application Nov. 18, 1966, Ser. No. 596,722
11 Claims. (Cl. 60—54.6)

ABSTRACT OF THE DISCLOSURE

A power brake mechanism including a pressure responsive moveable wall and valve means controlling the pressure differential on opposite sides of the wall, actuating means for moving the valve means in response to manual effort and being movable independently of reaction forces resulting from movement of the wall, and reaction means acting independently of the wall to resiliently resist movement of the actuating means in a substantially direct ratio to the force developed by the wall.

---

This application is a continuation of application 391,538, now abandoned, filed Aug. 24, 1964.

This invention relates to power brake systems for vehicles and particularly to systems in which a differential pressure motor or power unit actuates a master cylinder of a hydraulic brake system.

All hydraulic brake systems have been such that the degree of braking at the vehicle wheels has been a function of the force applied manually by the operator to the brake pedal so that the greater the pedal effort, the greater the braking effect. The drivers of vehicles have become accustomed to this characteristic and expect it in all brake systems. After it became common to use servomotors or power units to reduce the manual effort required to achieve braking, the demand for the same feel characteristics remained. Refinements in power brake systems have led to various means by which ratios are established between the forces that must be applied manually by the foot of the operator to produce braking and the forces that are produced by the power brake motor unit due to the differential pressure. That portion of the force that is applied manually usually is intended to be some fixed percentage of the force applied by the power unit and is generally referred to as pedal reaction or "feel."

In a power brake system "feel" normally is afforded by using a portion of the output pressure of the hydraulic system or of the power brake system and returning it to the foot of the operator. The feel-producing structures usually involve pistons acted on by hydraulic pressure to move them in a direction opposite to the movement of the piston in the master cylinder, levers which are pivoted in response to movement of parts such as the piston of the power unit, or separate and smaller pistons than the power piston of the power unit which are acted on by the same pressure differential causing power braking.

Such mechanisms have become increasingly complicated and expensive in the attempts to accurately reflect the ratio between that portion of the total braking effect produced by the power unit and that produced by manual effort. At the same time, such mechanisms incorporate pivots, seals, and other relatively moving parts which introduce frictional forces, all of which must be overcome either by power or by manual force before these forces can result in any braking effect. Furthermore, such complicated mechanisms and factors of friction cause hysteresis which in brief is a phenomenon wherein any given force applied at the brake pedal results in one value of hydraulic pressure when the brakes are being applied and in still another pressure when the brakes are being released. Hysteresis, the difference between these two values, varies over the full range of braking and must be kept to a minimum to have an acceptable power brake system. Furthermore, hysteresis is an extremly undesirable and critical factor which often varies under different conditions of brake operation and cannot be accurately predicted. In recent times, the phenomenon of hysteresis has become even more critical because of the great reduction in maximum brake pedal effort to produce the maximum power braking now in demand by automobile manufacturers, presumably as a result of demands by the driving public. A few years ago, the maximum amount of power braking was accomplished with as much as 80 or 90 pounds of force on the brake pedal. Today the same range of braking is expected with as little as 30 pounds of manual effort. This great reduction in range makes it extremely difficult to provide power brake systems which are sufficiently sensitive to accurately reflect brake output in terms of feel at the pedal. The frictional forces resulting from the more complicated mechanisms and the phenomenon of hysteresis become magnified in the narrow range of the maximum allowable pedal effort. In actual practice, conventional types of structures used in prior art power brake systems not only are incapable of accurately reflecting the degree of braking in terms of feel but also in many instances such systems are completely uncontrollable. In other words, the frictional forces and hysteresis vary from one brake application to another so that what an operator feels does not accurately portray the degree of braking and, as a consequence, the operator cannot judge the amount of pedal force that will be necessary to produce different types of vehicle decelerations, varying from extremely fast stops to gradual stops.

The difficulty of providing accurately feel characteristics in a power brake system is compounded by the nature of the various linkages and hydraulic circuits in a hydraulic system. The amount of braking or deceleration of a vehicle is related to the pressure of the hydraulic fluid in the braking system. To produce hydraulic pressure, it is necessary to displace the hydraulic fluid in the master cylinder. However, the nature of braking systems is such that there is no direct relationship between hydraulic fluid pressure and displacement. Initial displacement is normally utilized to take up lost motion and slack in mechanical linkages and pivots in the brake shoes at the wheels and to move the brake linings from their fully released or rest position to a position at which the brake lining is just touching the rotating surface to be braked. After this has occurred, subsequent displacement of hydraulic fluid results in increased hydraulic pressure and in braking in a substantially direct relation to each other. Displacement of the piston in the hydraulic master cylinder is directly related to the displacement of the power piston in the power brake unit. As previously mentioned, the degree of braking has in the past been a function of the amount of force applied on the pedal. Therefore, the amount of manual effort has determined the amount of movement of the power piston and, therefore, the amount of displacement of hydraulic fluid.

The present invention contemplates a complete departure from this principle and depends, not on the amount of force applied to the pedal, but rather on the position of the pedal. From this, it can be seen that the displacement of the hydraulic piston, the displacement of the power piston, and the displacement of the pedal are all in a direct relation to each other. However, since the driving public has become accustomed to the characteristic of feel, this phenomenon is introduced separately and externally of the power brake system in such manner that the effort required to produce a given displacement of the pedal results in a hydraulic pressure of the type found in conventional brake systems. The advantages of such a system are apparent since it is possible to greatly simplify the power unit by eliminating all the additional seals and mechanism normally required to produce feel. Such elimination of structure minimizes the problems created by friction and hysteresis and results in a system which is substantially less expensive. Furthermore, as will be pointed out more fully later, it is possible to use the identical power brake structure for a variety of vehicles, all of which have different ratios of hydraulic pressure and hydraulic displacement by simply varying the feel mechanism.

It is a general object of the invention to provide a power brake mechanism in which the position of a manual actuator, and not the manual force applied to it, is the principal factor determining the resulting braking effect.

It is a further object of the invention to provide a power brake mechanism of the above type in which movement of the manual actuator to its selected actuating position is resisted by a force corresponding to the force which drivers are accustomed to experience with conventional brake systems.

It is another object of the invention to provide such a power brake unit which may be adjusted and varied to make the force required of the operator correspond to the characteristics of the vehicle brake system.

A further object of the invention is to provide a power brake incorporating greatly simplified valve means actuated in response to the positon of an actuator.

Still another object of the invention is to provide a power brake unit of the before-mentioned type in which the relationship of the position of the actuating member determining the degree of braking and the externally imposed reaction forces are maintained in automatic adjustment relative to each other.

These and other objects of the invention will become more readily apparent from the following description and from the drawings disclosing a preferred embodiment of the invention.

Referring to the drawings:

FIGURE 1 is a longitudinal cross sectional view of the power brake mechanism with associated parts of a brake system shown schematically;

FIGURE 2 is a cross section taken on line 2—2 in FIGURE 1; and

FIGURE 3 is a diagram illustrating characteristics of the disclosed invention.

The differential pressure motor or power brake motor 10 embodying the invention has particular utility in hydraulic brake systems of the type illustrated diagrammatically in FIGURE 1. In such systems, hydraulic fluid is delivered from a master cylinder 11 through lines 12 to brake actuators 13 which act to move the brake shoes 14 into engagement with the brake drums 15 and apply the brakes at the wheels (not shown). These components are of conventional construction and their operation and use is so well known in the art that a detailed description is not required for a full understanding of the invention.

When the master cylinder 11 of such brake systems is actuated by a fluid pressure motor rather than by manual force alone, the brake system is referred to as a power brake ssytem.

The power brake motor 10 embodying the invention includes a housing 16 in which a movable wall unit 17 responds to pressure differentials to move an output member 18 which actuates the master cylinder 11 mounted on the housing 16. The pressure differential acting on the wall unit 17 is under the control of valve means which are actuated manually through a link 20 that is connected to brake pedal 21.

The power brake unit 10 is of the vacuum suspended type, that is, in its brake-released position as shown in FIGURE 1, vacuum exists in the chambers 22 and 23 formed in the housing at opposite sides of the wall unit 17 and the latter remains stationary. To actuate the unit, atmospheric air is admitted to the chamber 22 and since vacuum exists in chamber 23, the resulting pressure differential on the wall unit 17 moves it and the output member 18 to displace hydraulic fluid from the master cylinder 11 through the lines 12 to the brake actuators 13. The source of vacuum pressure is provided by placing the intake manifold of an internal combustion engine (not shown) in communication with a passage 24 formed in a wall of the housing 16.

The housing 16 is made up of a forward housing member 26 and a rearward housing member 27 which may be joined together in any conventional manner. In the illustrated embodiment, the joining is accomplished by a clamp ring 28 engaging flanges 29 formed on the covers 26 and 27.

The forward housing member 26 is provided with fastening means 30 by which master cylinder 11 may be connected directly to the housing 16. The rearward housing 27 is provided with studs 31 by which the entire assembly may be mounted on a bracket (not shown) within the engine compartment of a vehicle in position for connection to the pedal 21.

The movable wall unit 17 includes a disk shaped plate 41, an annular plate 42, and an annular diaphragm 43. The outer edge 44 of the diaphragm is clamped between the housing members 26 and 27, and the inner edge 45 is clamped between the plates 41 and 42 which may be permanently fastened together by spot welding. A reinforcing disk 46 of heavier material is welded to the plate 41 and rigidly mounts a stud 47 which is threaded to the push rod 18. The threaded connection provides means for adjusting the effective length of the output rod 18 and the disk 46 acts to distribute the load over the wall 17 when differential pressure moves the latter to displace the output member 18.

The only communication between the chambers 22 and 23 at opposite sides of the wall 17 is through an opening 51 which is formed in the plate 41 and forms part of the valve means. The valve means for actuating the power brake also includes a valve closure element 52 having a spherical seating surface 53 of resilient material which is complementary to the walls of the opening 51 of the wall 17. The valve element 52 is connected to one end of the lever 54 which pivots about a pin 56 fixed relative to the wall 17. Pivoting of the lever 54 permits the valve element 52 to move from the normal open position shown in FIGURE 1 to a closed position in which it engages the wall of opening 51 to isolate chambers 22 and 23 from each other.

The valve means also includes a tubular member 61 having its forward end mounted for sliding movement in an annular member 62 of resilient material fitted in an opening 63 in the rear housing member 27. The member 62 acts both as a bearing for the tube 61 and as a seal to prevent atmospheric pressure from entering chamber 22 except through the interior of the tube. One end of the tubular member 61 passes through an opening in the valve lever 54 and is connected to the latter through means including a pair of split washers 66 fitted in a groove 68 in the tubular member 61. This connection causes the lever 54 to pivot about the pin 56 in response to sliding movement of the tubular member 61.

An input member 71 is mounted for sliding movement in the tubular member 61 and its opposite ends are provided with flutes 72 which serve not only to guide the input member but also to permit atmospheric air to enter and occupy the tube 61. The end of the tube 61 adjacent the valve lever 54 forms a valve seat 73 which normally is closed by a valve element in the form of an annular seal 75. The valve element is of resilient material and is fitted on the forward end of the input member 71 for engagement with the valve seat 73. Movement of the input member 71 relative to the tube 61 serves to move the valve element 75 from seat 73 and admit atmospheric air to the chamber 22.

The rearward end 76 of the input member 71 is internally threaded for connection to the threaded end 77 of link 20. A cup-shaped member 78 has an opening 79 in its bottom portion to receive the threaded end 77 so that when link 20 and input member 71 are connected together, the cup-shaped member 78 is supported in fixed relation to the member 71 and link 20. The outer wall of the cup-shaped member 78 is slidably engaged with a bead portion 81 formed at one end of a tubular housing 82 which has a flange 83 at its opposite end rigidly connected as by welding to the rear housing member 27. In this manner, the rear portion of the input assembly formed by the member 71 and link 20 is supported for sliding movement.

The input assembly or actuating means is continually urged to the right by a compression spring 86 which is mounted within the tubular housing 82 and has its opposite ends engaging a seat 87 adjacent the housing 16 and a seat 88 formed by tabs on the lip of the cup-shaped member 78. Spring 86 affects the valve means by normally urging the valve element 75 into seating engagement with the valve seat 73. This in turn pulls tube 61 to the right and pivots the lever 54 clockwise about pin 56 so that the upper end of the lever engages a stop element 84 rigidly connected to plate 41. In this manner, valve element 52 is normally in an open position and valve element 75 is normally in a closed position.

At this point it should be noted that lever 54 is provided with a lower end portion 89 which, due to the resiliency of the metal forming the lever 54, acts as a leaf spring. By continuously remaining in engagement with the plate 41 the end portion 89 urges the lever 54 and valve element 53 in a counterclockwise direction. As a consequence, valve element 52 is subject to a spring effect which urges it towards its closed position on the valve seat 51. However, in the normal position of the parts shown in FIGURE 1, the valve element 52 remains in an open position, with the upper end of lever 54 in engagement with stop 84 because coil spring 86 overcomes the effect of the lever spring 89 by urging valve element 75 into seating engagement with the tubular member 61 and pulling the latter to the right.

The structure described to this point is sufficient to an understanding of the operation of the valve assembly. In a normal brake-released position, the parts occupy the position shown in FIGURE 1 and equal vacuum pressure exists in the chambers 22 and 23 which are in open communication with each other through the opening 51.

Initial movement of the brake pedal 21 causes the input member 71 to move to the left. As a consequence, the valve element 75 moves to the left but it remains on the seat 73 because the tube 61 also is moved to the left by lever 54 due to the action of the lever spring 89. At the same time such movement causes the valve element 52 to engage the valve seat 51. Under these conditions, chambers 22 and 23 become isolated from each other and the valve element 75 on its seat 73 isolates chamber 22 from the atmosphere. This is commonly referred to as the lap position of the valve means.

Further movement of the brake pedal 21 causes the input member 71 to move to the left relative to the tube 61. Tube 61 remains stationary since its movement is prevented by the lever 54 which remains in a fixed position relative to the movable wall 17 because of engagement between the valve element 52 and valve seat 51. As a result, movement of the input member 71 relative to the tube 61 moves the supply valve element 74 from its seat 73 and admits atmospheric pressure to the variable pressure chamber 22. Since vacuum pressure exists in chamber 23, this creates a differential pressure acting on the movable wall 17 and causes it to move to the left. Such movement of the wall is transmitted through the disk 46 and to the output member 18. This, in turn, results in displacement of hydraulic fluid to the brake actuators 13.

During movement of the wall 17, continued movement of the pedal 21 will cause a follow-up movement of the input member 71 which serves to maintain the valve element 75 in spaced relation to its seat 73 to permit continued admission of atmospheric air to chamber 22. This continues to increase the differential pressure causing additional movement of the wall 17. If pedal movement is stopped, movement of the wall 17 will continue for an instant. During this time, the tubular member 61 continues to move with the wall 17 due to the action of the lever 54 which is held in fixed position by the closed vacuum valve 52 on seat 51. This moves the seat 73 into engagement with the stationary supply valve element 75 to interrupt further admission of atmospheric pressure. In turn, the interruption of the supply of atmospheric pressure causes the wall 17 to come to a stop. Under these conditions, the vacuum valve element 52 and supply valve element 75 are again in ther lap position and the differential pressure acting on wall 17 acts to hold the hydraulic pressure in the brake system in balance.

If the pressure in the hydraulic brake system is to be increased, the pedal may be moved an additional amount and valve element 75 will again become unseated to increase the pressure in the chamber 22. On the other hand, if the brakes are to be released, removal of the foot from the pedal 21 will cause coil spring 86 to move the input member 71 to the right relative to the stationary tube 61 and valve element 75 will become seated to prevent further admission of atmospheric air. Thereafter, spring 86 will overcome the action of the leaf spring 89 and cause the vacuum valve 52 to move from its seat 51. Upon this occurrence, vacuum in the chamber 23 is available to the chamber 22 and, as the pressures on opposite sides of the wall 17 become balanced, the wall 17 moves to the right until the flange 91 on the plate 41 engages the rear housing member 27. During this time, the spring 86 continues to urge the member 71 and tubular member 61 to the right. When the wall 17 engages housing member 27, the brakes are completely released.

In the event of failure of the vacuum source, actuation of the brakes may be accomplished with manual effort alone. In this event, the wall 17 remains stationary due to lack of differential pressure and movement of the pedal 21 results in movement of input member 71 to the left in FIGURE 1 until the end 92 engages a depression 93 in plate 41. Thereafter, manual force from pedal 21 is transmitted directly to the output member 18.

It will be noted that, unlike most power brake units, there is no provision for transmitting reaction forces resulting from the differential pressure acting on the wall 17 to the input member 71. In prior art devices, the transmission of such forces is used to produce reaction or "feel" by which an operator can sense the degree of braking that has been achieved. In the disclosed embodiment of the invention, however, manual effort is used for the sole purpose of overcoming the biasing means which resists movement of the actuating means required to operate the valve means. Furthermore, the degree of differential pressure on wall 17 depends on the distance the input member 71 has been moved and not on the amount of manual effort applied to pedal 21. No portion of the manual force results in braking effort. In this sense, the valve means is actuated in accordance with the position of the input member 71 and reaction, or "feel," is provided by separate means in the form of a biasing arrangement which will now be described.

The reaction means by which an operator may sense the position of the valve mechanism includes the spring 86 that performs the dual function of urging valve element 75 on its seat and provides a component of the reaction force. In addition, the reaction means includes another compression spring 96 of smaller diameter and of shorter length than the spring 86. Spring 96 is disposed within a tube 97 which has one end rigidly connected to the housing member 27 in much the same manner as tubular housing 82. A number of tabs 98 (only one is shown) are formed in the wall of the tube to protrude into its exterior to act as a spring seat for one end of the spring 96. The opposite end of the spring 96 projects beyond the rearward end of tube 92 and is adapted to be engaged by a collar 99 mounted on input member 71.

Referring to FIGURE 2, collar 99 is split at 101 and has an opening 102 which offers an interference fit with input member 71. This normally maintains the collar in a predetermined position on the input member 71 during most operations of the power brake unit. The collar 99 has a threaded opening 103 forming part of the split 101 which is internally threaded to receive a screw 104 (FIGURE 1). The threads in the opening 103 are of the tapered pipe type so that upon rotation of the screw 104 to move its head toward the collar 99, the split 101 is enlarged which in turn enlarges the opening 102 and permits movement of the collar 99 axially relative to the input member 71.

The function and operation of the biasing arrangement will become more apparent by referring to FIGURE 3 in which a curve is plotted to represent the relation of displacement of a piston in the master cylinder of a conventional hydraulic brake system and the resulting force due to hydraulic pressure applied to the brakes at the wheels of a vehicle. The ordinate has been used to designate force and the abscissa to designate displacement. It will be noted that in the initial range of the curve between points 111 and 112 increments of fluid displacement result in smaller increments of force. This represents the initial range of brake operation in which fluid displacement is utilized to take up slack in the brake system so that actuators 13 move the braking elements such as shoes into contact with the drums or rotatable element to be braked. Thereafter, additional increments of displacement in the range between points 112 and 113 result in larger increments of output force until maximum displacement results in maximum force at point 113.

Curves of the type shown in FIGURE 3 will vary slightly for different types of vehicles but in each case the curve will have the same general form. The exact curve for a given type of vehicle can be obtained by methods well known to those skilled in the art.

For conventional hydraulic brake systems the same form of curve also can be used to represent the relationship of pedal displacement (instead of hydraulic fluid displacement) to manual input force at the pedal (instead of hydraulic output force). Again, it will be noted that in the initial range of the curve between points 111 and 112, a small amount of force is required to produce the relatively large amount of pedal displacement necessary to produce the fluid displacement to absorb the slack of the brake system referred to previously. In the subsequent range between points 112 and 113, greater pedal force is required to produce increments of pedal displacement. However, in this range the increments of displacement are effective to produce greater output force and hence braking.

Referring now to FIGURE 1, displacement of manual member 71 from the illustrated position requires the compression of the spring 86 between the housing 16 and the spring seat 88. The amount of effort required to accomplish this is represented in FIGURE 3 by that portion of the curve between points 111 and 112. This portion of operation accomplishes displacement of hydraulic fluid to take up the slack in the brake system so that the actuators 13 move the braking elements such as shoes into contact with the rotating element to be braked, such as the drum. At this point, spring 86 has been compressed to a point at which collar 99 engages spring 96. Thereafter, movement of the input member 71 requires not only compression of the spring 86 but also of spring 96. The manual force required to accomplish this increases and is represented by that portion of the curve in FIGURE 3 between the points 112 and 113.

Referring again to the curve shown in FIGURE 3, the abscissa indicated as displacement is capable of representing not only hydraulic fluid displacement but also the amount of movement of various elements such as the pedal 21, the wall 17, the output member 18, or the piston of the master cylinder. In like manner, the ordinate of the curve can be used to represent both the output force in the form of hydraulic pressure applied to the braking elements at the wheels and also the input force which must be applied manually by the operator. Because of this, it is possible to consider the curve to represent the relationship of hydraulic displacement to manual input force. By the use of appropriate springs, it is possible to impose a resistance to pedal displacement which will closely approximate the manual effort needed in conventional hydraulic or power brake systems to produce the necessary hydraulic displacement for braking. Furthermore, by the proper location of collar 99 relative to the input member 71, the point 112 on the curve in FIGURE 3 is determined.

Thus far, the description and operation of the power brake unit 10 has been concerned with the operation of brakes which are maintained in good adjustment, i.e., as the brake linings wear on shoes 14, the spacing between the linings and the brake drums 15 are maintained relatively constant. In many modern automobiles, such spacing is maintained by automatic adjusters which are well known in the art. However, on older vehicles and others not equipped with automatic adjusters, the necessary relation between brake linings and brake drums must be periodically adjusted manually. With the present power brake unit, such manual adjustment becomes unnecessary since the unit 10 makes certain adjustments automatically to compensate for the wear of the linings. If it is assumed that the condition of the parts in the power brake unit 10 illustrated in FIGURE 1 are those when the brakes are in good adjustment and it is assumed further that the brakes become suddenly worn or otherwise poorly adjusted, a greater amount of hydraulic displacement will be required to bring the linings into contact with the brake drums before actual braking begins. However, the collar 99 will have engaged the end of spring 96 before actual braking begins and as a result the operator will encounter a pedal resistance. With improperly adjusted brake shoes, the wall unit 17 will have become subject to the maximum differential pressure and will have moved the maximum distance without achieving the maximum displacement of hydraulic fluid required to produce maximum braking. Under such conditions, the power brake unit 10 is automatically brought into adjustment to accurately reflect the conditions by a single maximum application of the brake pedal. This can occur with the vehicle in motion or at rest. The operator applies a maximum effort to the pedal which causes collar 99 and input member 71 to move to the left. The collar 99 will engage the end of tube 97 before output member 18 has moved a sufficient distance to produce the required hydraulic displacement. As a result, collar 99 remains stationary and continued manual effort on pedal 21 causes sliding movement of input member 71 relative to collar 99 until the end 92 of output member 71 engages the portion 93. Thereafter, movement of member 71 continues with wall 17 and output member 18 until maximum hydraulic displacement is achieved, at which point, further leftward movement is prevented. When manual effort is released from the pedal 21, the power brake components will return to their brake released position as shown in FIGURE 1 except that collar 99 will be relocated to a new position at some point to the right of the one illustrated in FIGURE 1. Thereafter, any subsequent application of the brakes will result in a reaction at pedal 21 which accurately reflects the degree of valve actuation and brake application. In other words, collar 99 will engage the end of spring 96 when the brake linings engage the brake drums to reflect the point 112 on the curve in FIGURE 3. Furthermore, the valve will have been actuated to achieve a maximum pressure differential on the wall 17 at the same time as maximum hydraulic fluid displacement is achieved as represented by point 113 on the curve in FIGURE 3. To achieve this automatic adjustment, the fit between the collar 99 and the input member 71 is such that collar 99 resists displacement by the force of spring 96 but can be displaced by a greater manual effort on pedal 21.

If during maintenance of the vehicle, the brakes are readusted or new brake linings are installed on the vehicle, the proper relation of the collar 99 on the input member 71 is readily obtained. This is accomplished by turning the screw 104 so that the head approaches the collar 99 to enlarge the opening 102 and permit movement of the collar 99. The collar is then moved to the left as far as possible and the screw 104 is returned to its original position so that opening 102 contracts and collar 99 grasps the input member 71. Thereafter, proper adjustment is achieved when the operator depresses the pedal 21 with a maximum force to cause the collar 99 to engage the tubular housing 97 and be moved to the right on input member 71 to its proper location as described above.

Although two springs have been found convenient to accomplish the reaction requirements of the disclosed power brake unit, it would be apparent that other resilient means and spring elements can be used. For example, it would be possible to use a conical spring or springs in which the spacing of the coil varies between its two ends. In each case, the initial manual effort required to compress the spring would be less than the effort required to finally compress the spring.

It should be observed that a minimum of parts, seals, and springs are used to accomplish the results previously referred to. Furthermore, the biasing means is located externally of the housing 16 where it may be easily replaced, adjusted, or otherwise modified. In addition, the valve means is actuated in response to the position of a control member rather than in response to the force applied to it and the reaction which is noticed by the operator is produced artificially by biasing means which may be varied to produce the desired "feel" characteristics. The power brake unit includes automatic adjusting means by which the relation of the degree of braking and the imposed characteristic of feel are maintained accurately to obviate the need for automatic brake adjusters or frequent manual brake adjustments.

It should be understood that it is not intended to limit the invention to the above described forms and details, and that the invention includes such other forms and modifications as are embraced by the scope of the appended claims.

What is claimed is:

1. A power brake mechanism comprising a housing and a pressure responsive wall forming therewith chambers at opposite sides of said wall, valve means having a normal position balancing pressures in said chambers and having a connection with a source of pressure to vary the pressure in one of said chambers to move said wall in a predetermined range upon movement of said valve means from said normal position, actuating means for moving said valve means from said normal position in response to manual effort and being movable in a predetermined range during movement of said wall in its predetermined range independently of reaction forces resulting from movement of said wall, and reaction means operatively disposed between said actuating means and said housing and acting independently of said wall to resiliently resist movement of said actuating means in one direction in a substantially direct ratio to the force developed by said wall.

2. A power brake mechanism comprising a housing and a pressure responsive wall forming therewith chambers at opposite sides of said wall, fluid displacement means including a part movable in a predetermined range by a force increasing at a relatively constant rate in the initial portion of said range and increasing at a relatively greater constant rate in the remaining portion of said range, means connecting said wall and said fluid displacement means for movement of the latter in response to differential pressure acting on said wall, valve means having a normal position balancing pressures in said chambers and having a connection with a source of pressure to vary the pressure in one of said chambers upon movement of said valve means from said normal position, actuating means for moving said valve means from said normal position in response to manual effort independently of reaction forces resulting from movement of said wall, and biasing means disposed between said housing and actuating means and resisting movement of said actuating means in one direction relative to said housing independently of the movement of said wall in a substantially direct ratio to the force exerted by said wall to move said fluid displacement means and being operative to return said actuating means in the other direction relative to said housing in the absence of manual effort acting on said actuating means.

3. A power brake mechanism comprising a housing, a pressure responsive wall supported in said housing for movement in a predetermined range and forming with said housing a constant pressure chamber at one side and a variable pressure chamber at the other side of said wall, valve means having a normal position balancing pressures in said chambers and having a connection with a source of pressure to vary the pressure in said variable pressure chamber upon movement of said valve means from said normal position, actuating means for manually moving said valve means and being movable from an initial position corresponding to the normal position of said valve independently of reaction forces resulting from movement of said wall, and biasing means operatively disposed between said actuating means and said housing and acting independently of said movable wall to resiliently resist movement of said actuating means with increased resistance as said actuating means moves away from its initial position in proportion to the force developed by said wall as the latter moves in said predetermined range.

4. A power brake mechanism comprising a housing, a pressure responsive wall supported in said housing for movement in a predetermined range and forming with said housing a constant pressure chamber at one side and a variable pressure chamber at the other side of said wall, valve means having a normal position balancing pressures in said chambers and having a connection with a source of pressure to vary the pressure in said variable pressure chamber upon movement of said valve means from said normal position to move said wall from one end of said predetermined range, actuating means for manually moving said valve means and being movable from an initial position corresponding to the normal position of said valve through an intermediate position and to a final position at which time said wall is at the other end of said predetermined range, said actuating means being movable independently of the force exerted by said wall, and biasing means operatively disposed between said housing and said actuating means to resist movement of the latter with a force increasing at a substantially constant rate during movement from said initial to said intermediate position and at a relatively higher constant rate during movement from said intermediate to said final position.

5. In a power brake mechanism, the combination of a housing, a wall in said housing movable on a longitudinal axis of the latter and dividing said housing into a constant pressure chamber and a variable pressure chamber on opposite sides of said wall, valve means including a valve seat formed in said wall on one side of said axis and permitting communication between said chambers, a first valve element complementary to and movable into engagement with said valve seat to close the latter to the flow of fluid pressure between said chambers, a lever element supporting said valve element at one end being pivoted at the other end relative to a point on said wall diametrically opposed to said valve seat, biasing means associated with said lever and said wall to urge said valve element to a closed position on said seat, a tubular member supported in a wall of said housing for sliding movement in the direction of said axis and having an opening at one end disposed in said variable pressure chamber, said tubular member having its other end connected to a source of relatively high pressure, a second valve element complementary to said opening and movable to close the latter to isolate said variable pressure chamber from the atmosphere, manually movable means slidable in said tubular member and being connected to said second valve element to move the latter relative to said opening, said tubular member having one end connected to said lever for pivoting the latter in response to sliding movement of said tubular member, and biasing means associated with said manually movable means and said housing to urge said second valve element to a closed position on said opening and move said lever in one direction to a position in which said first valve element is spaced from said seat, said biasing means resisting movement of said manually movable means in proportion to the force developed by said movable wall upon movement of the latter.

6. A power brake mechanism comprising, a housing and a pressure responsive wall forming therewith chambers at opposite sides of said wall, fluid displacement means including a part movable in a predetermined range by a force increasing at a relatively constant rate in the initial portion of said range and increasing at a relatively greater constant rate in the remaining portion of said range, means connecting said wall and said fluid displacement means for movement of the latter in response to differential pressure acting on said wall, valve means having a normal position balancing pressures in said chambers and having a connection with a source of pressure to vary the pressure in one of said chambers upon movement of said valve means from said normal position, actuating means movable independently of the reaction forces resulting from movement of said wall, and reaction means operatively disposed between said housing and said actuating means to resist movement of the latter relative to said housing in the range between its said initial and said intermediate position with a force increasing in proportion to the force moving said fluid displacement means in the latter's initial range and further resisting movement of said actuating means between its intermediate and final position with a force increasing at still a greater rate in proportion to the force acting on said fluid displacement means in the latter's remaining range.

7. A power brake mechanism in accordance with claim 6 in which said reaction means includes a stop element connected to said actuating means and a spring disposed between said stop element and said housing to afford said resistance.

8. A power brake mechanism comprising a housing and a pressure responsive wall forming therewith chambers at opposite sides of said wall, fluid displacement means including a part movable in a predetermined range by a force increasing at a relatively constant rate in the initial portion of said range and increasing at a relatively greater constant rate in the remaining portion of said range, means connecting said wall and said fluid displacement means for movement of the latter in response to differential pressure acting on said wall, valve means having a normal position balancing pressures in said chambers and having a connection with a source of pressure to vary the pressure in one of said chambers upon movement of said valve means from said normal position, reaction means including a pair of stop elements on said actuating means, and a pair of springs each disposed between one of said stop elements and said housing, one of said springs being operative to resist movement between the initial and final positions of said actuating means, the other of said springs being engageable by its associated stop element when said actuating element reaches its said intermediate position to resist movement therefrom to said final position.

9. A power brake mechanism comprising a housing and a pressure responsive wall forming therewith chambers at opposite sides of said wall, fluid displacement means including a part movable in a predetermined range by a force increasing at a relatively constant rate in the initial portion of said range and increasing at a relatively greater constant rate in the remaining portion of said range, means connecting said wall and said fluid displacement means for movement of the latter in response to differential pressure acting on said wall, valve means having a normal position balancing pressures in said chambers and having a connection with a source of pressure to vary the pressure in one of said chambers upon movement of said valve means from said normal position, reaction means including a first stop element on said actuating means and a first spring engageable with said stop element and said housing to resist movement of the latter over its full range of movement, and a second stop element on said actuating means and a second spring engageable by said second stop element when said actuating means reaches its intermediate position to resist movement of the latter therefrom to its final position.

10. A power brake mechanism in accordance with claim 9 in which said second stop element is mounted on said actuating means for movement therewith and for movement relative thereto in response to a force in excess of the force exerted by said spring, and abutment means fixed relative to said housing and engageable with said stop means upon initial movement of said actuating means a maximum amount relative to said housing.

11. A power brake mechanism comprising a housing and a pressure responsive wall forming therewith chambers at opposite sides of said wall, valve means having a normal position balancing pressures in said chambers and having a connection with a source of pressure to vary the pressure in one of said chambers to move said wall in a predetermined range upon movement of said valve means from said normal position, actuating means for moving said valve means from said normal position in response to manual effort and being movable in a predetermined range during movement of said wall in its predetermined range, reaction means including a stop element mounted on said actuating means, biasing means disposed between said stop element and said housing to resist movement of said actuating means, said stop means being supported on said actuating means for movement therewith and for movement relative thereto in response to a force in excess of the force exerted by said spring, and abutment means fixed relative to said housing and engageable with said stop means upon initial movement of said actuating means a maximum amount relative to said housing, said stop element being releasably mounted on said actuating means for movement manually toward said abutment means.

References Cited
UNITED STATES PATENTS 3,151,530 10/1964 Brown _____ 91—376
3,209,657 10/1965 Randol _____ 91—369
3,212,408 10/1965 Randol _____ 91—369

MARTIN P. SCHWADRON, *Primary Examiner.*
PAUL E. MASLOUSKY, *Examiner.*